April 22, 1969     G. E. SUNDEEN, JR     3,440,557

AMPLIFIER APPARATUS WITH MEANS TO AVOID SATURATION

Filed Sept. 14, 1965

WITNESSES:
Bernard R. Gieguer
Leon M. Garman

INVENTOR.
Gunnar E. Sundeen, Jr.
BY
Gordon H. Telfer
ATTORNEY

United States Patent Office 3,440,557
Patented Apr. 22, 1969

3,440,557
AMPLIFIER APPARATUS WITH MEANS TO AVOID SATURATION
Gunnar F. Sundeen, Jr., Pinehurst, Pasadena, Md., assignor to Westinghouse Electric Corporation, Pittsburgh, Pa., a corporation of Pennsylvania
Filed Sept. 14, 1965, Ser. No. 487,236
Int. Cl. H03f 1/34
U.S. Cl. 330—103          3 Claims

ABSTRACT OF THE DISCLOSURE

In an amplifier circuit a feedback loop is connected from the output to a summing point isolated from the amplifier input while a clamping circuit is connected directly back to the input to avoid saturation of the amplifier.

---

Figure 1:
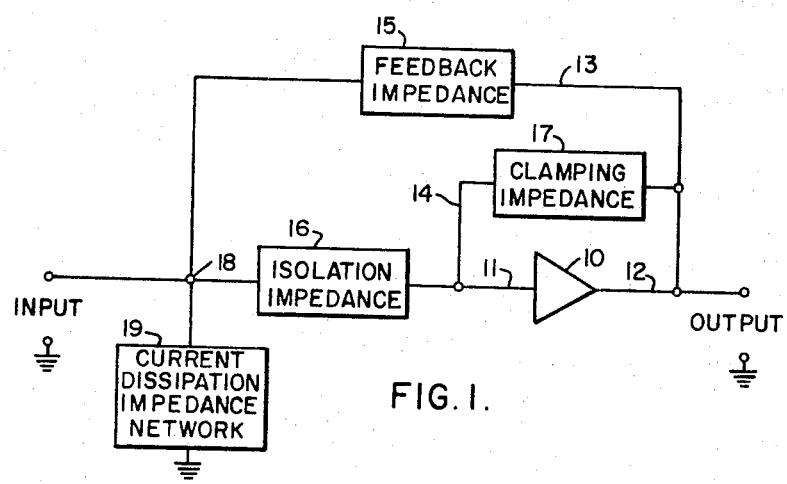

This invention relates to electronic apparatus for the amplification of electronic signals and particularly to such apparatus employed in testing and measuring equipment where the occurrence of an overload or saturation condition would adversely affected the accuracy of measurements for an undesirably long time period.

Manufacturers and users of electronic components such as semiconductor devices and integrated circuits require means to accurately and rapidly determine the operability of a particular component. Measurement of DC transistor parameters, for example, is usually performed by the use of a highly stabilized amplifier. The amplifier produces an output that varies with the input up to an input signal level at which it saturates. It is characteristic of such amplifiers to remain in saturation for a substantial period following the removal of the condition which caused it to be driven to saturation. The period for recovery may be as long as 45 seconds. This, of course, presents only a minor problem when testing a small number of individual components. However, in high speed, automatic test systems the intended purpose is to be able to feed rapidly a number of components through the testing apparatus to check their operability. If, in making current measurements, the component under test is shorted and full supply current flows through the amplifier, thus saturating it, this is detected and of course the device under test is rejected. Because of the slow recovery time the apparatus continues to indicate that successive devices are also faulty, which may be contrary to the fact, if they are tested before the amplifier has become unsaturated. The same condition exists to a lesser degree when the reading being taken even only slightly exceeds the programmed full scale range. The use of current limiting resistors in current measurements is not desirable with specifications calling for highly regulated supply voltages.

It is, therefore, an object of the present invention to provide amplifier apparatus with means to avoid saturation of the amplifier so it can be used for rapid and accurate testing of electronic components.

Another object is to provide improved electronic testing apparatus suitable for the testing of semiconductor devices and integrated circuits.

Another object is to provide improvements to amplifier apparatus that may be achieved by relatively simple external circuit elements associated with commercially available highly stabilized amplifiers.

The invention, briefly, achieves the above-mentioned and additional objects and advantages by providing an amplifier with a feedback loop not directly to the amplifier input but to a summing point isolated from the input by an isolation impedance and a clamping circuit loop connected between the output of the amplifier directly to the input so that if the output voltage tends to exceed the clamping voltage, as it would in saturation, the output is driven to the clamping voltage and a feedback path is provided directly to the amplifier input effectively shifting the summing point. Excess input current is shunted to ground through a current dissipation impedance network.

Figure 2:
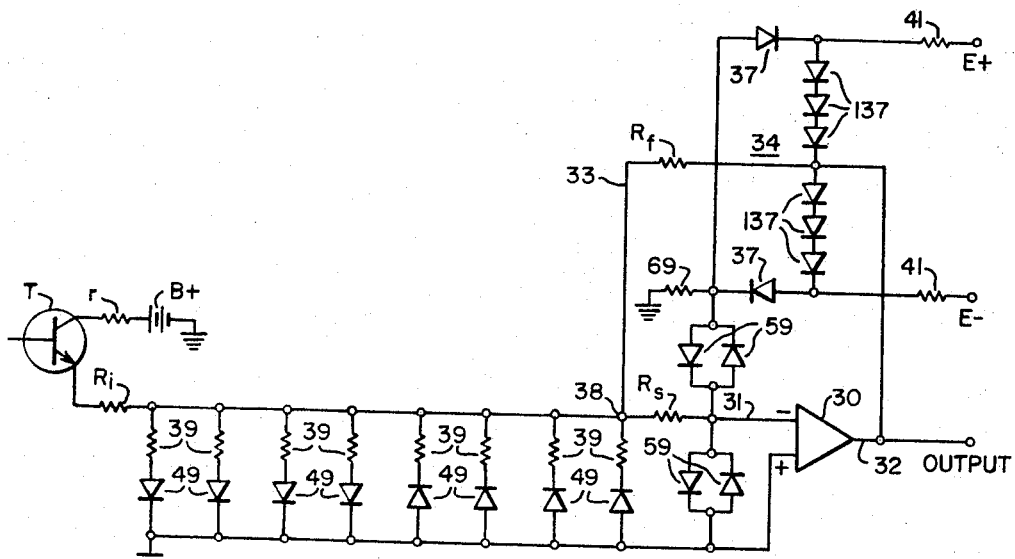

The invention, together with the above-mentioned and additional objects and advantages, will be better understood by reference to the following description taken with the accompanying drawing, wherein:

FIGURES 1 and 2 are schematic diagrams illustrating embodiments of the present invention.

Referring to FIGURE 1, the essentials of the invention are schematically shown and include an amplifier 10 having a signal input 11 and a signal output 12. Preferably the amplifier 10 is one having a highly stabilized characteristic, that is, with a non-shifting operating point. A signal modulator and demodulator may be part of the amplifier 10. The output 12 of the amplifier 10 is connected externally to the input 11 through two circuit branches 13 and 14. The first circuit branch 13 includes a feedback impedance 15 and an isolation impedance 16. The second circuit branch 14 includes a clamping impedance 17.

The purpose of the feedback impedance circuit branch 13 is the usual one of supplying a portion of the output signal to the input out of phase with the applied input signal so that the effective signal is the difference between them (sometimes called the error signal). However, contrary to prior practice, the summing point 18 of the feedback and the applied signals is not directly at the amplifier input 11 but is removed therefrom by the isolation impedance 16.

The clamping impedance circuit branch contains elements that may, for example, be diodes (either conventional or Zener types) whose conductivity characteristic limits the maximum voltage that may be developed across them.

Since no significant current flows in the input terminal 11 of the amplifier 10 (being largely cancelled by the feedback signal), the voltage offset produced by the isolation impedance 16 is small and results in no degradation of amplifier performance.

The amplifier 10 operates normally as long as the output voltage does not exceed the clamping voltage of circuit branch 14 or the input current does not exceed the output current capacity of the amplifier. The clamping voltage is determined by the clamping impedance components 17 that are selected so that it is at a level below the voltage level at which the amplifier saturates. Consequently, on a signal overload, the output voltage swings to the clamping voltage, at which point the clamping impedance circuit branch 14 provides a feedback path directly to the amplifier input. Excess input current is dissipated through a series of impedances in the current dissipation impedance network 19. The network 19 may comprise diodes and current sharing resistors, the number of which are determined by the available short circuit supply current of the test voltage supply and the rating of the diodes.

The value of the isolation impedance 16 is not critical. It should be large enough to act, with the impedances of the current dissipation network 19, as a current limiter to limit current to the amplifier 10 to less than its current carrying capacity so that the amplifier is not permitted to saturate.

It will be apparent that the various elements of the invention disclosed in FIG. 1 may be selected in accordance with the knowledge of those skilled in the art. However, by way of further description and example, reference should be made to FIG. 2 for a more particular embodiment of the invention.

FIG. 2 illustrates an operational amplifier circuit including amplifier 30 and employing a feedback circuit branch 33 including resistor $R_f$ (corresponding to impedance 15, FIG. 1) to summing point 38. It is isolated from the input 31 of the amplifier by an isolation resistance $R_s$ (corresponding to impedance 16, FIG. 1). The clamping circuit branch 14 includes the various oppositely poled diodes 37 and 137 (corresponding to impedance 17, FIG. 1) necessary for symmetrical operation that are connected from the output 32 of the amplifier 30 directly to the input 31. The various diodes 137 in each of the parallel parts of the clamping circuit may of course be replaced by suitably poled Zener diodes.

The current dissipation impedance network includes a plurality of diodes 49 and current sharing resistors 39 (corresponding to network 19, FIG. 1) connected in parallel with some diodes being oppositely poled for symmetrical operation. Additionally, there is shown in this embodiment current dissipation diodes 59 and resistor 69 that are connected between the clamping circuit and ground, for further assistance in dissipating high input current. However, it is not considered that these are necessary in addition to the current dissipation networks.

An input resistor $R_i$ is illustrated. However, in the instance in which the practice of the invention is most advantageous, that is, in current measurement, $R_i$ is usually set to be zero.

The transistor T and supply circuit including battery B+ and resistor R illustrate the practice of the invention in testing a transistor device for emitter to collector characteristics. For example, a voltage source capable of one ampere short circuit current might be used to provide a normal current to the summing point 38 of about 50 nanoamperes. However, of course, if the emitter and collector regions of the transistor are shorted a full one ampere will be provided to the summing point and this condition is such as would ordinarily cause saturation of the amplifier 10.

Supplies E+ and E— are connected to different parallel arms of clamping circuit branch 34 through resistors 41.

It should be noted that the input diodes 49 and feedback clamping diodes 37 and 137 should have extremely low leakage. At the microvolt offset levels present at the input of the amplifier during normal operation, the diodes 49 and 59 represent an essentially infinite impedance to the input signal. During an overload condition a voltage appears at the normal summing point 38 due to the fact that excess current is flowing through the diodes 49 and current sharing resistors 39. This voltage results in a current flow in the isolating resistor to the new summing point at the amplifier input 31. This current is fed back through the now forward biased output clamping circuit 34 and the amplifier maintains control. Thus no current is allowed to flow into the amplifier input 31, resulting in rapid recovery on removal of the overload signal. Recovery from overload is now limited only by the normal response of the amplifier when operated in its linear range.

This circuit also has application in electrometers and other bench type meters which are subject to slow recovery from an overload.

Still referring to FIG. 2, the following components have been successfully employed in practicing this embodiment of the invention wherein the amplifier was one (SP656 sold by George A. Philbrick Researches, Inc.) having a saturation voltage of about 11 volts. The apparatus may be used for transistor testing as described above (50 nanoamperes normal current; 1 ampere short circuit current):

| | | |
|---|---|---|
| Resistor $R_f$ | ohms | $10 \times 10^6$ |
| Resistor R | | Zero |
| Resistors $R_s$ and resistors 41 | ohms | 1000 |
| Resistors 39 | do | 100 |
| Resistor 69 | do | 78000 |
| Diodes 37 and 49 | | 1N914 |
| Diodes 137 | | 1N540 |
| Supplies E+ and E— | volts | 15 |

While the present invention has been shown and described in a few forms only, it will be apparent that various changes and modifications may be made without departing from the spirit and scope thereof.

What is claimed is:

1. Electronic apparatus comprising: an amplifier characterized by exhibiting an output signal that varies with its input signal up to an input signal level at which it saturates; a feedback loop including a feedback impedance connected between the output of said amplifier and a summing point isolated from the input of said amplifier by an isolation impedance; means to avoid saturation of said amplifier comprising a clamping circuit loop connected between the output of said amplifier and the input of said amplifier at a point between said amplifier and said isolation impedance; said summing point and the input of said amplifier having no saturable amplifier elements therebetween.

2. Electronic apparatus in accordance with claim 1 and further comprising: a plurality of current paths connected between said summing point and a reference potential point, each of said current paths comprising a resistance and an asymmetrically conductive impedance element.

3. Electronic apparatus in accordance with claim 2 wherein said isolation impedance and said impedance elements of said plurality of current paths develop an input current to said amplifier that is less than that which causes saturation of said amplifier.

References Cited

UNITED STATES PATENTS

| | | | |
|---|---|---|---|
| 3,041,535 | 6/1962 | Cochran | 330—110 X |
| 3,092,729 | 6/1963 | Cray | 330—110 X |
| 3,248,569 | 4/1966 | Weekes | 330—103 X |
| 3,252,007 | 5/1966 | Saari | 328—142 X |
| 3,375,460 | 3/1968 | Miller | 330—51 |

ROY LAKE, Primary Examiner.

JAMES B. MULLINS, Assistant Examiner.

U.S. Cl. X.R.

330—110; 328—171